United States Patent
Reuss et al.

(10) Patent No.: US 8,987,599 B2
(45) Date of Patent: Mar. 24, 2015

(54) FLAT ENERGY CABLE

(75) Inventors: Thomas Reuss, Milan (IT); Thomas Kittel, Milan (IT); Arnd Guenther Carl, Milan (IT)

(73) Assignee: Prysmian S.p.A., Milan (IT)

( * ) Notice: Subject to any disclaimer, the term of this patent is extended or adjusted under 35 U.S.C. 154(b) by 342 days.

(21) Appl. No.: 13/388,599

(22) PCT Filed: Aug. 5, 2009

(86) PCT No.: PCT/IT2009/000365
§ 371 (c)(1),
(2), (4) Date: Jul. 13, 2012

(87) PCT Pub. No.: WO2011/016066
PCT Pub. Date: Feb. 10, 2011

(65) Prior Publication Data
US 2012/0267164 A1 Oct. 25, 2012

(51) Int. Cl.
*H01B 7/08* (2006.01)
*H02G 11/00* (2006.01)
*H02G 3/04* (2006.01)

(52) U.S. Cl.
CPC ........... *H02G 11/006* (2013.01); *H02G 3/0487* (2013.01)
USPC .................. 174/117 F; 174/70 R; 174/113 R; 174/70 C

(58) Field of Classification Search
CPC ..... H02G 3/0475; H02G 11/006; H02G 3/02; H02G 3/26; H02B 7/0838; H01B 9/00; H01B 7/0838; H01B 7/0081; H01B 7/17; F16G 13/16
USPC ................... 248/74.2, 71, 70, 74.4, 74.3, 73; 138/118, 118.1, 119, 120; 174/113 R, 174/117 R, 117 F, 110 R, 98, 68.1, 350, 70
See application file for complete search history.

(56) References Cited

U.S. PATENT DOCUMENTS

| | | | | |
|---|---|---|---|---|
| 1,751,143 A | * | 3/1930 | Frederickson | 174/51 |
| 3,229,030 A | * | 1/1966 | Baermann | 174/117 F |
| 3,448,204 A | * | 6/1969 | Perrone et al. | 174/115 |
| 5,343,989 A | | 9/1994 | Hu et al. | |
| 6,036,259 A | * | 3/2000 | Hertel et al. | 296/216.01 |
| 6,215,068 B1 | * | 4/2001 | Meier | 174/68.1 |
| 6,405,843 B1 | * | 6/2002 | Friedman | 191/22 R |
| 6,984,782 B2 | * | 1/2006 | Ikeda et al. | 174/21 JS |

(Continued)

FOREIGN PATENT DOCUMENTS

| | | |
|---|---|---|
| DE | 31 33 782 A1 | 3/1983 |
| JP | 2000-30542 | 1/2000 |

(Continued)

OTHER PUBLICATIONS

International Search Report from the European Patent Office for International Application No. PCT/IT2009/000365, mailing date Apr. 29, 2010.

*Primary Examiner* — Lisa Lea Edmonds
*Assistant Examiner* — Keith Depew
(74) *Attorney, Agent, or Firm* — Finnegan, Henderson, Farabow, Garrett & Dunner, L.L.P.

(57) ABSTRACT

A flat energy cable includes at least one push-pull strength member; a connecting system connected to the outer surface of a cable sheath; and a plurality of magnets connected to the connecting system.

22 Claims, 6 Drawing Sheets

(56) References Cited

U.S. PATENT DOCUMENTS

| | | | |
|---|---|---|---|
| 7,520,122 B2* | 4/2009 | Kitagawa et al. | 59/78.1 |
| 7,521,633 B2* | 4/2009 | Jostmeier et al. | 174/68.1 |
| 7,640,722 B2* | 1/2010 | Utaki | 59/78.1 |
| 7,718,894 B2* | 5/2010 | Blase | 174/68.1 |
| 7,735,309 B2* | 6/2010 | Jostmeier et al. | 59/78.1 |
| 7,893,353 B2* | 2/2011 | Utaki | 174/72 A |
| 7,942,169 B2* | 5/2011 | Komiya et al. | 138/110 |
| 8,024,916 B2* | 9/2011 | Kuebel | 59/78.1 |
| 8,487,186 B2* | 7/2013 | Walid | 174/110 R |
| 2006/0070764 A1* | 4/2006 | Utaki et al. | 174/68.1 |
| 2006/0219421 A1* | 10/2006 | Kitagawa | 174/19 |
| 2007/0144376 A1 | 6/2007 | Jostmeier et al. | |
| 2009/0277151 A1 | 11/2009 | Jostmeier et al. | |
| 2011/0162883 A1* | 7/2011 | Groset et al. | 174/70 R |
| 2011/0302900 A1* | 12/2011 | Wendig et al. | 59/35.1 |
| 2012/0082422 A1* | 4/2012 | Sarchi et al. | 385/101 |
| 2012/0097421 A1* | 4/2012 | Gundel | 174/113 R |
| 2013/0051742 A1* | 2/2013 | Blackwell et al. | 385/102 |

FOREIGN PATENT DOCUMENTS

| | | |
|---|---|---|
| JP | 2006-78439 | 3/2006 |
| WO | WO 2008/009425 A1 | 1/2008 |
| WO | WO 2008/049824 A2 | 5/2008 |

* cited by examiner

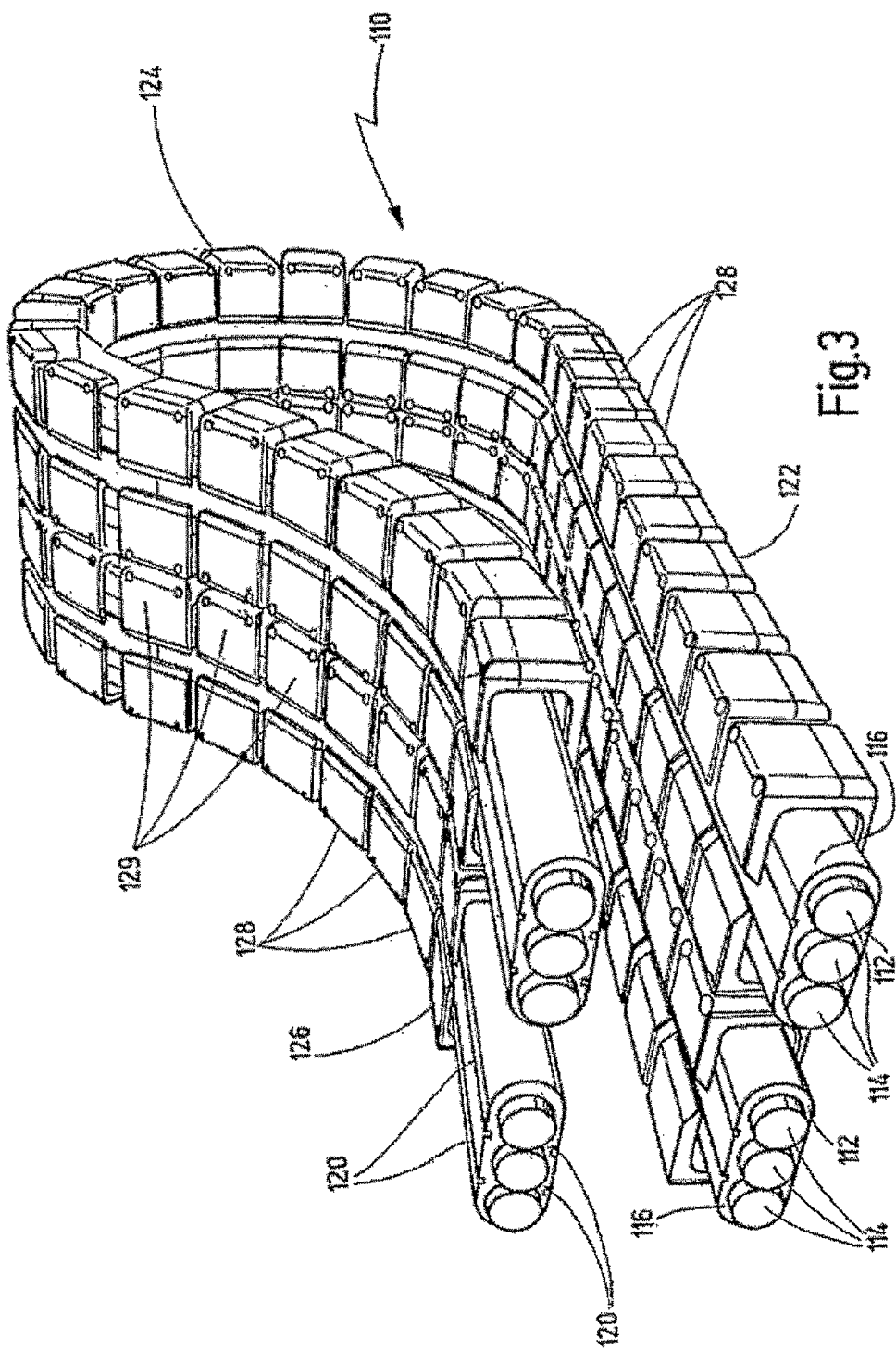

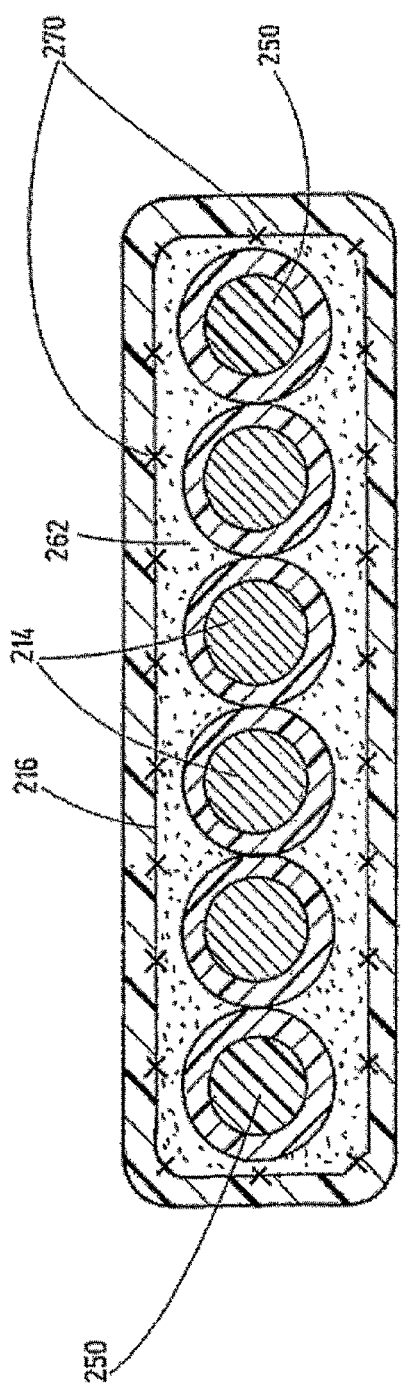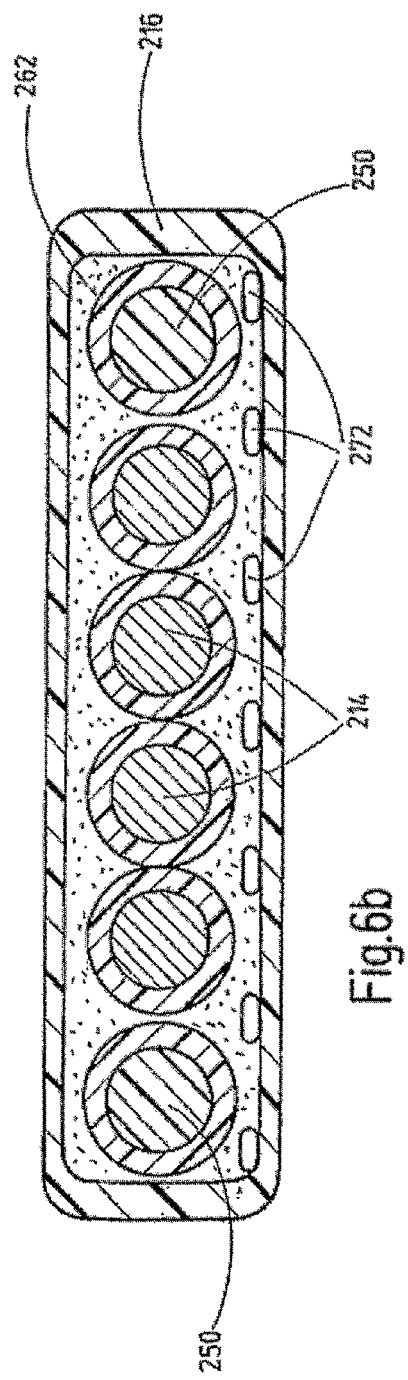

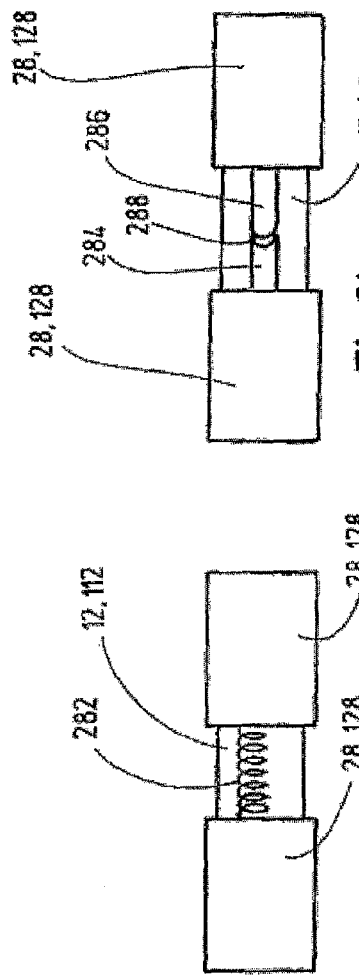
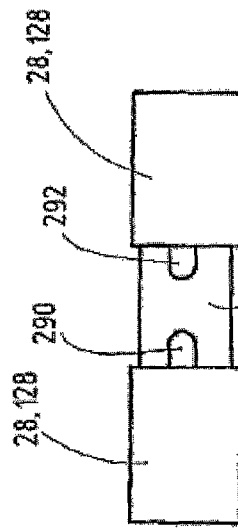
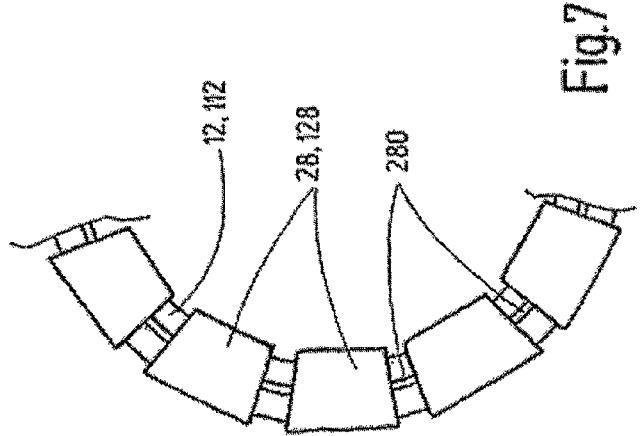

FLAT ENERGY CABLE

CROSS REFERENCE TO RELATED APPLICATION

This application is a national phase application based on PCT/IT2009/000365, filed Aug. 5, 2009, the content of all of which is incorporated herein by reference.

BACKGROUND OF THE INVENTION

1. Field of the Invention

The invention relates to a flat energy cable with at least one core and with at least one sheath accommodating the core.

2. Description of the Related Art

The purpose of such flat cables is to carry at least one core—comprising an electric conductor insulated by an insulating layer—, and, optionally, telecommunication conductor/s—such as optical fiber/s—and/or fluid duct/s—for example for transporting oil, water or gas—from supply equipment to a device, for example a movable machine. In the following of the present description, the optional telecommunication conductor/s and fluid duct/s could be collectively referred to as "lines".

The flat energy cable is provided with a sheath protecting the at least one core and the optional lines from external influences. In moving devices, especially designed to execute movements over a large area, the flat cable is divided into an upper upper length portion and a lower length portion. The lower length portion lies in a distribution trough on a distribution surface whilst the upper length portion that is connected with the lower length portion by means of a bent section. In this there is the advantage, compared to a cable guide in a power supply chain, that such flat cable device is easier and cheaper to manufacture. However, a flat cable does not have the same stability as a power supply chain and therefore is not as resistant to wear. Furthermore, there is the disadvantage that, in comparison to a power supply chain, in view of the flexibility of the cable an excessive bending at the bent section can occur, challenging the cable integrity and possibly causing the sliding of the two longitudinal section one in touch with the other, causing further damages by friction.

It is, therefore, a problem faced by the invention to develop a flat energy cable in such a manner that it has an improved stability and resistance to wear.

Another problem to be considered is that of push and pull forces exerted, sometimes abruptly, by the moving device. These forces can challenge the integrity of the cable and reduce the work-life thereof. In the case of pushing forces, a specific phenomenon called "buckling" can occur.

US 2007/0144376 relates to a device for guiding at least one line that protects it, in the distribution trough, in such a manner that it is guided at least partially without contact. The cable is enclosed by a sheath, on the lower side of which, facing the distribution surface, a lower-side magnet is disposed. Facing the lower-side magnet, a distribution-surface magnet is disposed on the distribution surface. As a result, the sheath, with the cable enclosed in it, is held suspended above the distribution surface.

The cable is guided by a device bearing magnets. No hint is provided about the push/pull forces exerted on the cable and to remedy to the problems therefrom.

U.S. Pat. No. 6,405,843 relates to a self supporting electrical cable, especially of use in linear motion devices. The cable is in the form of a band having a crowned or curved cross-section. The band is self supporting and is typically employed in a looped configuration. The band is composed of a Mylar or other plastic or electrically insulating laminate with electrical conductors and reinforcing elements. The reinforcing elements are typically stainless steel. In use the cable is usually folded back on itself 180° to provide a loop configuration with a fixed radius loop end in which the loop is moveable along the direction of travel.

The cable does not comprise magnetic parts. The self-support feature is provided by a curved configuration of the cable surface and by the band on the cable surface. No hint is provided about the push/pull challenging forces exerted on the cable.

U.S. Pat. No. 6,215,068 relates to a line guiding assembly. The line bundling means has disposed on its outside a sliding means with good slidability. The sliding means prevents friction between an upper length portion and a lower length portion of a line assembly. The line bundling means may comprise line clamps spaced apart in the longitudinal direction of the line assembly, with the sliding means being disposed on the outside of said line clamps. The sliding means consist of a flexurally elastic material, such as steel, or a slidable plastic material, such as polyurethane, polyamide, and polytetrafluoroethylene. The sliding means then does not only form a mechanical sliding protection for the cable jacket, but is adapted to keep the tensile and thrust forces, exerted during reciprocation of the movable means, away from the line assembly. When the longitudinal ends of the sliding means are attached in such a manner to the stationary and the movable means, respectively, a strain relief for the line assembly is also established. The assembly does not comprise magnetic parts. The cable of the assembly does not have specific reinforcing elements for protecting the cable against pull and push forces exerted thereupon.

JP 06-078439 relates to a power supply device to a movable part, where a permanent magnet is provided on the side of the movable part so as to prevent the meandering of a flat cable. The cable assembly, moving in a guide case provided with a permanent magnet plate, comprises a flat cable and a magnetic plate positioned onto the cable surface internal to the loop. Optionally, a tape shape guide (a resin tape) is provided onto the cable surface facing the guiding case for lowering the friction.

The cable is moved in a guiding device. The magnet provided to the cable operates with the permanent magnet of the guiding device. No hint is provided about the push/pull forces exerted on the cable and to remedy to the problem therefrom.

SUMMARY OF THE INVENTION

The invention provides a flat energy cable comprising at least one core and at least one sheath provided in radially external position with respect to said core, comprising:
  at least one push-pull strength member extending substantially parallel to the at least one core;
  a connecting system connected to the outer surface of the sheath;
  a plurality of magnets connected to the connecting system, said magnets having parallel commonly oriented magnetic axes, directed at right angle to the surface of the sheath.

Advantageous further developments are subject of the dependent claims.

The thought underlying the invention is that the push-pull strength member provides the flat energy cable with a sufficient stiffness to counteract the buckling phenomenon and a suitable tensile strength.

Advantageously, the push-pull strength member has a design and is made of material adapted to relieve the cable structure, especially the core/s, from mechanical forces imparted to the cable by movable parts, in particular with a movable device.

By providing the flat energy cable with a plurality of magnets via a connecting system with magnetic poles of the same polarity pointing away from an upper surface of the sheath, friction and thus wear is reduced when an upper length portion of the flat energy cable is moved on top of a lower length portion. It is even possible to hold the upper length portion suspended over the lower length portion, thus reducing friction to a minimum.

It is preferred that the connecting system comprises at least one longitudinal groove, which is either provided in the outer surface of the sheath or in a band attached onto the outer surface of the sheath. In particular, it is advantageous if the connecting system comprises at least two longitudinal grooves arranged on opposite sides of the cable. More preferably, the connecting system comprises at least two pairs of longitudinal grooves arranged on opposite sides of the cable.

The groove or the grooves advantageously serve to operatively associate, for example to fasten, a plurality of clips to the sheath or to the band. Preferably, the clips being arranged in row, one after the other in the longitudinal direction of the flat energy cable. On the one hand, the clips can help to stiffen the flat energy cable in sections by forming sections that are essentially inflexible. By this way, a bending radius is defined that is approximately constant for the whole flat energy cable, if the clips are arranged at approximately constant intervals from each other. On the other hand, the clips can accommodate the magnets.

According to a preferred embodiment, the at least one push-pull strength member is arranged with its axis positioned in a neutral bending plane of the cable. The neutral bending plane is a plane substantially parallel to the longitudinal direction of the cable in which the cable does not or only slightly change its length upon bending.

Preferably, the at least one push-pull strength member comprises a central tensile bearing element surrounded by a containment layer. Such a composite design provides the strength member with a sufficient tensile strength due to the tensile bearing element as well as with a sufficient stiffness due to the containment layer. For this purpose, it is preferred that the central tensile bearing element is made of fibrous material selected from aromatic polyamide fibers, carbon fibers, high modulus fibers or a combination thereof. Examples of high modulus fibers are polyamide fibers and aromatic polyamide fibers (aramid).

A push-pull strength member made of glass reinforced fibres (GRP) rods was tested with negative results: it broke after a number of bending cycles representative of the field application. This confirms that it is not obvious to design a push strength member that is flexible enough to survive repeated bending.

Preferably, the containment layer preferably comprises an elastomeric layer, for example comprising a rubber material, like ethylene-propylene rubber (EPR).

According to the preferred embodiment, the containment layer comprises two layers including, preferably, a shell made of a polymeric material such as, a polyamide resin, polybutylene, polytetrafluoroethylene. The elastomeric layer has a flexural modulus lower than that of the shell material. Advantageously, the shell surrounds the elastomeric layer.

Advantageously, the band attached onto the outer surface of the cable sheath is made of substantially the same polymer material of the sheath, for example of a material belonging to the same polymeric family.

Optionally, the sheath comprises an inner sheath portion in which the at least one core is embedded and an outer sheath portion surrounding the inner sheath portion.

Advantageously, a pattern of reinforcement threads or of reinforcing elements running in the longitudinal direction is arranged between the inner and the outer sheath in at least a portion. The reinforcement threads or of reinforcing elements can further improve the stiffness and the tensile strength of the flat energy cable. For example, the reinforcement threads are made of high modulus fibers, like polyamide fibers, aromatic polyamide fibers (aramid), carbon fibres, regenerated cellulose fibers (Rayon). For example, the reinforcing elements are made of high modulus fibers, like polyamide fibers, aromatic polyamide fibers, carbon fibres.

If the flat energy cable is provided with a plurality of longitudinal grooves, it is preferred that the grooves are arranged symmetrically with respect to the neutral bending plane and preferably symmetrically with respect to a plane perpendicular to the neutral bending plane. Furthermore, according to an advantageous embodiment, at least some of the clips are guided by the groove or the grooves to be able to move in the longitudinal direction of the sheath.

According to a preferred embodiment, a spacer is arranged between two adjacent clips in the row, respectively. The spacers either prevent the clips from a relative movement or limit such a movement. It is possible that the spacers connect two adjacent clips, respectively, being preferably elastically bendable. Especially, it is possible that the spacer is a helical spring. However, it is also possible that the spacer comprises a first portion connected with a first clip, a second portion connected with a second clip and a hinge connecting the first and the second portions, to enable the flat energy cable to form the bent section between the upper and the lower length portion. It is also possible, that the spacer comprises a first spacer element connected with a first clip and a second spacer element connected with a second clip, respectively, wherein the first spacer element is positioned at a distance from the second spacer element. In this embodiment, the adjacent clips are not connected one to the other, but a minimum distance between the clips is achieved due to the spacer.

Advantageously, the flat energy cable according to the invention can contain at least one additional conductor accommodated in the at least one sheath, for example, selected from telecommunication conductor, optical conductor, copper pair, control conductor and fluid duct for carrying, for example, water, oils, lubricants, air, compressed air. In the case of optical conductor, at least one optical fiber is advantageously protected by polymeric layers surrounding each glass core, both individually and collectively.

The at least one core and the optional at least one additional conductors can run substantially parallel to the cable longitudinal axis or can be stranded. The at least one core and the optional at least one additional conductors can be provided with the axis thereof laying in the neutral bending plane of the cable or laying in an upper or lower plane with respect said bending plane.

For example, a plurality of copper pairs can be provided to surround a push-pull strength member.

In a further embodiment, several, preferably rigid, clips being detachably affixed, at a distance from each other, to at least one line package in its longitudinal direction. In this case a rigid clip is to be understood as being a clip that, in the longitudinal direction of the line package, is not flexible or is only slightly flexible and, as a result, stiffens the line package over its length. In this case it is preferred that the clips are arranged at fixed intervals from each other.

The thought underlying the invention is that at least one line package is stiffened in sections by means of the clips and, in this way, sections are formed that are essentially inflexible. In this way, a bending radius is defined that is constant for the whole line guiding device, if the clips are arranged at fixed intervals from each other.

It is particularly preferred if the line guiding device has at least two line packages running parallel to each other, in which case each line package has at least one flexible line enclosed in a flexible cover and where the line packages are connected to each other by means of several, preferably rigid, clips arranged at a distance from each other in the longitudinal direction. In this way the clips serve not only to stiffen the line packages in sections but also the interconnection of several line packages running parallel to each other. In particular, flat cables running next to each other can be connected to each other in such a way that they can be handled like a single flat cable. In this case, it is preferred that the line packages are structurally the same.

In order to obtain a reliable fixing of the clips it is preferred that they at least partly surround at least one of the line packages. In order to better define the bending radius, sequential clips in the longitudinal direction can be connected to each other so that they can rotate towards each other, preferably to a limited degree.

The clips are advantageously affixed to at least one of the line packages by means of a tongue and groove joint. In this case it is preferred that at least one of the line packages has at least one groove running longitudinally. The groove may be moulded into the cover or, alternatively, a strip, into which the groove is moulded, can be connected to the cover. The strip can be extruded together with the cover or be firmly glued to the cover.

According to an advantageous further development of the invention the clips each have at least one magnet in which case the magnets are arranged in such a way that similarly named magnetic poles point away from an upper surface of the line package or of the line packages. If the line package is folded like a power supply chain so that an upper stringer is laid on a lower stringer, by means of the repulsion forces of the magnets, the upper stringer can be held suspended above the lower stringer. This contact-free guiding reduces wear. The magnets can be advantageously held either in accommodation openings in the clips or affixed to the outside of the relevant clip.

According to an advantageous embodiment the clips are in one piece. Affixing to the cable package may take place by means of elastic deformation of the clips and locking onto the cable package. According to another advantageous embodiment the clips are composed of several parts detachably connected to each other.

Preferably at least one line package has one string of spring steel embedded in the cover, running parallel to at least one cable. The string of spring steel stiffens the line package but, however, allows bending of the line package. In this case it is possible for the clips to grip through at least one line package and to be affixed to the string of spring steel. As a result the clips are affixed to the most resilient components of the line package.

BRIEF DESCRIPTION OF THE DRAWINGS

In the following, the invention will be explained in greater detail by means of exemplary embodiments shown schematically in the drawings. They show FIG. 1 a line guiding device comprising a cable of the invention according to a first exemplary embodiment;

FIG. 3 a line guiding device comprising a cable of the invention according to a second exemplary embodiment;

FIG. 6a, 6b a cross-section view of a flat energy cable according to further embodiments of the invention;

FIG. 7 a schematic view of a cable bend according to a third embodiment and

FIGS. 8a to 8c schematic views of two adjacent clips with different spacers.

DETAILED DESCRIPTION OF THE INVENTION

Figure 1:
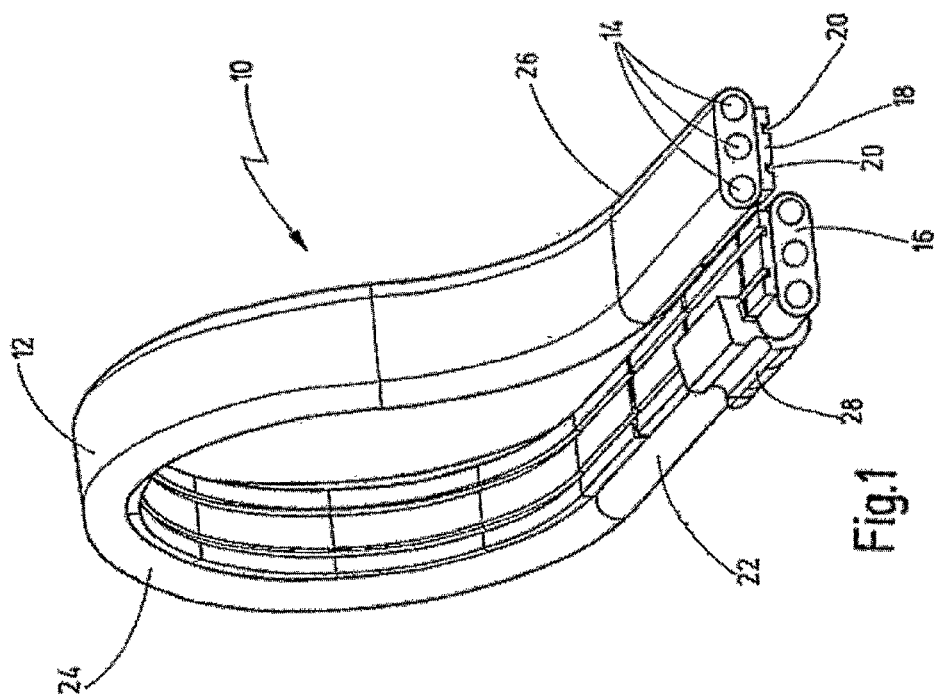
Figure 4:
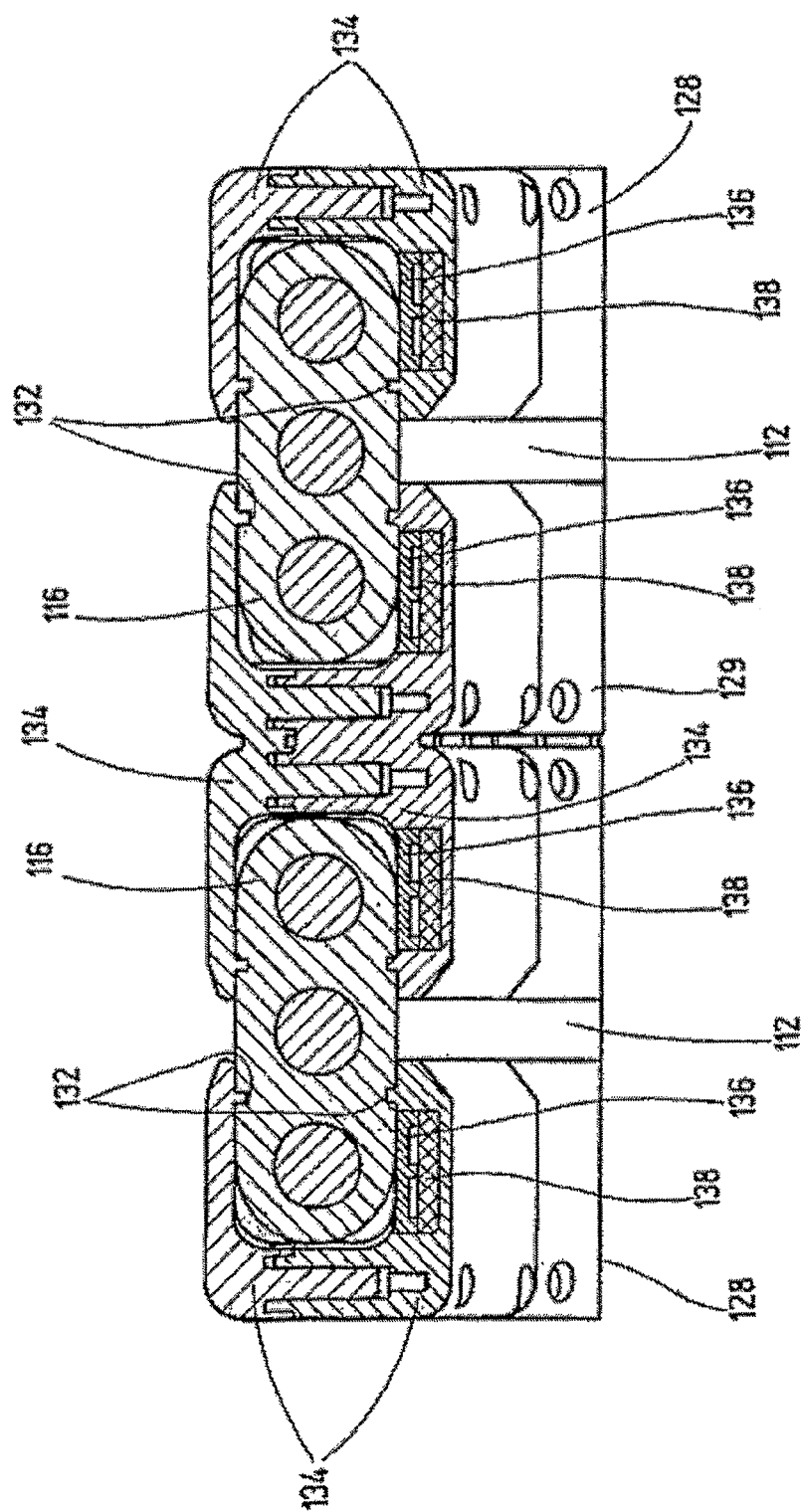
FIG. 4 a cross-section of a length portion of the line guiding device as per FIG. 3.

A line guiding device 10 (FIG. 1, 2) comprises a flat energy cable 12 in accordance with an exemplary embodiment. The flat energy cable 12 has three cores 14 that are located next to each other, that are embedded in a sheath 16, and that run parallel in the longitudinal direction of the flat energy cable 12. A band 18 extending the whole length of the flat cable 12 is placed on the sheath 16 and is firmly attached to the sheath 16 by means of vulcanisation. The band 18 has two grooves 20 running parallel in the longitudinal direction. In FIG. 1 it is given to understand that the flat energy cable 12 is folded in such a way that it has a lower length portion 22, a bent section 24 connecting to lower length portion 22 and an upper length portion 26 connecting to the bent section 24, in which case the upper length portion 26 can be laid on the lower length portion 22. In this case, flat energy cable 12 can serve as the supply cable that connects power supply equipment with a movable machine.

Figure 2:
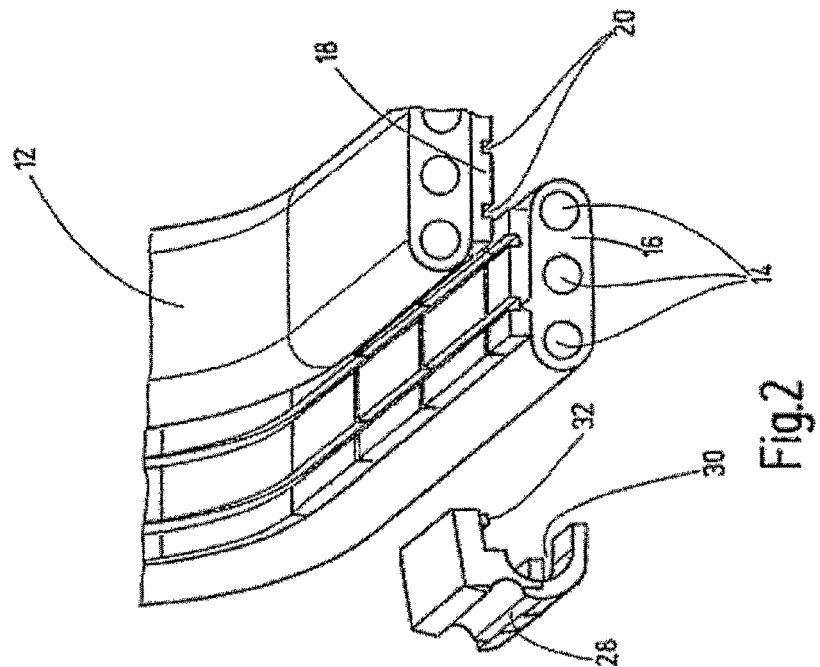
FIG. 2 a section of FIG. 1 with the clip removed.

Several one-piece clips 28 can be locked onto the flat energy cable 12. One of these clips 28 is shown in FIGS. 1 and 2. Clip 28 has a receiving contour 30 for the partial enclosure of the flat energy cable 12 from which a tongue 32 projects for the purpose of engaging into the groove 20 and the formation of a tongue-and-groove joint. By means of elastic bending the clip 28 can be affixed to the flat energy cable 12. Since it is essentially rigid in the longitudinal direction, the arrangement of clips 28 on the flat energy cable 12 produces a sectional stiffening of the flat energy cable 12. In this case clips 28 are preferably affixed to the flat energy cable 12 at regular intervals from each other. When the flat energy cable is in use, the clips 28 can move in the longitudinal direction, the tongues 32 being guided in the groove 20. The sectional stiffening of the flat cable 12 results in better handling since it defines the bending radius.

The line guiding device 110 (FIG. 3, 4) houses two flat energy cables 112 in accordance with another exemplary embodiment, said cable 112 having a sheath 116 and cores 114 embedded into the sheath 116. Unlike the first exemplary embodiment the grooves 120 are, however, moulded directly into the sheaths 116. Tongues 132 of two different types of clips 128, 129 engage into the grooves 120. External clips 128 each surround an external part of one of both flat energy cables 112. Inner clips 129 arranged between the flat energy cables 112 each surround a part of both flat energy cables 112 and, as a result, connect together the flat energy cables 112 that run parallel to each other. In this case the clips are designed in two parts. Both parts of the clips 134 are screwed together.

A bent section 124, to which in turn an upper length portion 126 is connected, connects to a lower length portion 122 of the flat cables 112 that are connected together. In order to reduce wear clips 128, 129 have accommodation openings 136 on the upper side of the lower length portion 122 and the lower side of the upper length portion 126 into which magnets 138 are placed in such a way that the magnetic poles of the upper length portion lie opposite the similarly named magnetic poles of the lower length portion 122. In this way the upper length portion 126 is held suspended above lower length portion 122. If the flat cables 112 are laid onto a flat ground without bending, the magnetic axes of the magnets 138 are arranged substantially parallel to each other and perpendicular to the upper surfaces of the sheaths 116. The clips 28 of FIGS. 1 and 2 can be equipped with magnets in the same way.

Figure 5:
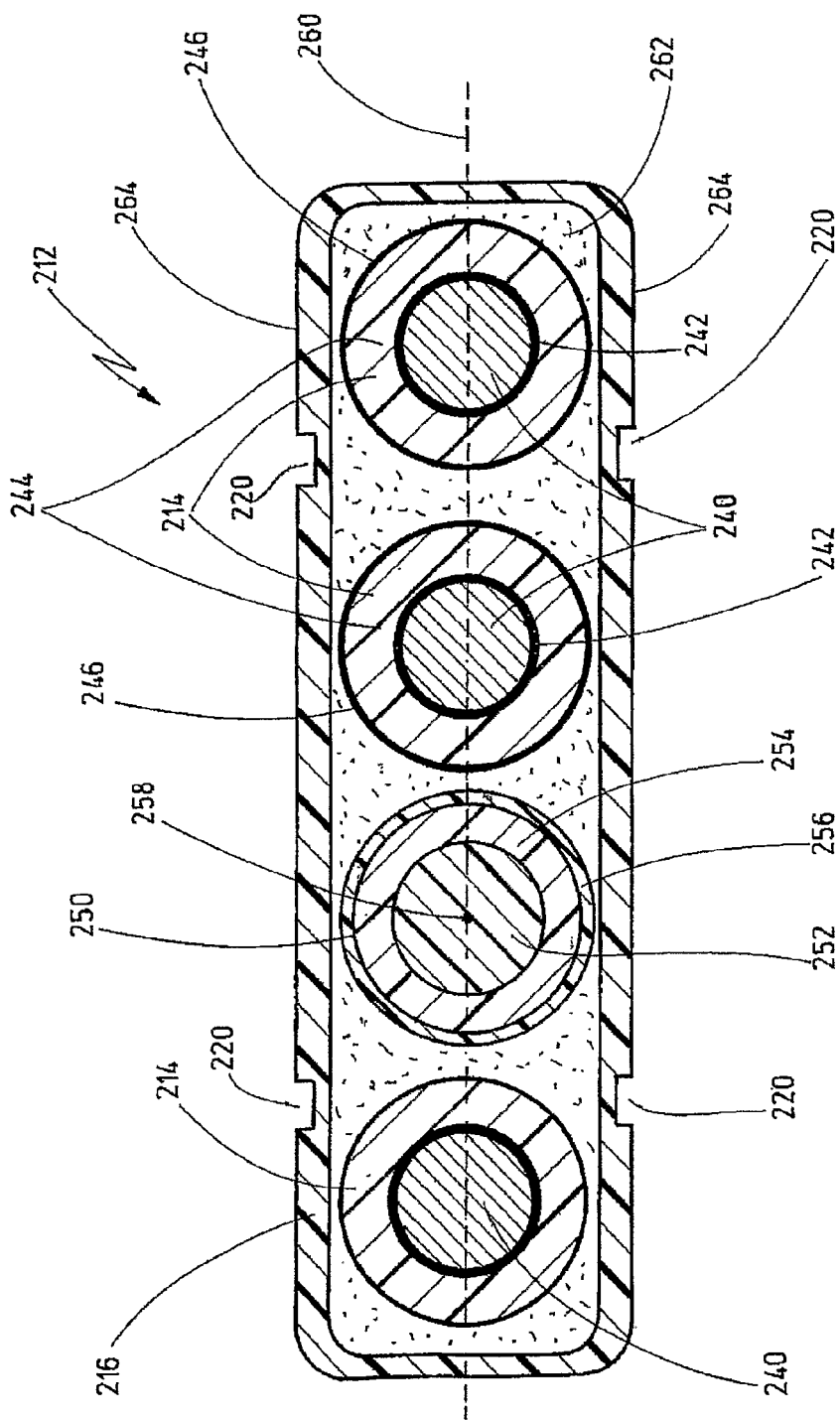
FIG. 5 a cross-section view of a flat energy cable according to an embodiment of the invention.

FIG. 5 shows a cross section of a flat energy cable of the invention as it can be used with the line guiding devices according to FIGS. 1 to 4. The flat cable 212 comprises three cores 214, each of the cores 214 comprising an electrical conductor 240, for example a copper conductor formed by a bundle of tinned or bare copper electrical wires stranded together according to conventional methods. The conductors 240 are surrounded by an inner semi-conductive layer 242, which is surrounded by an insulating layer 244, which is surrounded by an outer semi-conductive layer 246. The cores 214 run parallel to each other in a longitudinal direction of the flat energy cable 212. The flat energy cable 212 further comprises a push-pull strength member 250, which extends parallel to the cores 214 over the whole length of the flat energy cable 212. The strength member 250 comprises a central tensile bearing element 252 which is surrounded by a containment layer comprising an inner elastomeric layer 254 and an outer shell 256 made, for example, of a polyamide material. The central bearing element 252, which is made, for example, of aromatic polyamide, is positioned with its axis 258 in a neutral bending plane 260 of the flat energy cable 212. The cores 214 and the strength member 250 are accommodated in an outer sheath portion 216 which has a rectangular cross section with rounded corners. The sheath 216 is made of a cured polymeric material, for example reinforced heavy-duty thermosetting elastomer, such as high density polyethylene (HDPE), polychloroprene, polyurethane or NBR-based compound. The space between the cores 214, the strength member 250 and the outer sheath portion 216 is filled with an inner sheath portion 262 made of a polymeric material, which is extruded directly on the longitudinal structural elements 214, 216, 250 of the flat energy cable 212. The sheath 216 is provided in its upper and lower outsides 264 with a pair of grooves 220, respectively. The grooves 220 are positioned symmetrically with respect to the neutral bending plane 260 and with respect to a plane perpendicular to the neutral bending plane 260.

The embodiments of the flat energy cables according to FIG. 6a, 6b comprise, respectively, reinforcement threads 270 and reinforcement elements 272, both running parallel to the cores 214 and the strength members 250 and positioned between the outer sheath portion 216 and the inner sheath portion 262. In these embodiments, four cores 214 are positioned in the middle of the flat energy cable 212, wherein to the left and to the right of the cores 214 there is positioned a push-pull strength member 250, respectively.

Though core 214 and strength member 250 in the shown embodiments are positioned side by side, it is also possible to arrange the cores 214 around one or several of the strength members 250. The same applies for additional conductors possibly present in the flat energy cable of the invention.

FIG. 7 shows a side view of the bent section 24, 124 of a flat energy cable 12, 112 provided with clips 28, 128 as shown in FIGS. 1 to 4. Between two adjacent clips 28, 128, there is positioned a spacer 280, respectively, with its axis in the neutral bending plane of the flat energy cable 12, 112. The spacer keeps the adjacent clips 28, 128 at a minimum distance to each other. It can be an elastically bendable bar as shown in FIG. 7 or a helical spring 282 as shown in FIG. 8a. It can also comprise a first portion 284 and a second portion 286 with a hinge 288 connecting them. The hinge can be of a kind that the first and second portions 284, 286 are bendably connected or, as shown in FIG. 8b, in a kind that the first and second portions 284, 286 can be separated. It is also possible that the spacer comprises a first spacer element 290 and a second spacer element 292 as shown in FIG. 8c, the spacer elements 290, 292 being positioned at a distance from each other.

The invention claimed is:

1. A flat energy cable with at least one core and with at least one sheath accommodating said core, the flat cable when lying horizontally having an upper surface facing upwards, a lower surface facing downwards, an upper length portion including one end of the cable, and a lower length portion including an opposite end of the cable, the cable comprising:
    at least one elongate push-pull strength member extending substantially parallel to the at least one core and accommodated in the sheath;
    a connecting system comprising a plurality of clips physically connected to an outer surface of the sheath; and
    a plurality of magnets operatively associated with the clips adjacent to the upper surface of the sheath, said magnets being arranged in a way that magnetic poles of a same polarity point away from the upper surface of the sheath and that, when the upper surface of the upper length portion is positioned on top of and facing the upper surface of the lower length portion, the upper length portion is held suspended above the lower length portion by magnetic repulsion.

2. The flat energy cable according to claim 1, wherein the connecting system comprises at least one longitudinal groove.

3. The flat energy cable according to claim 2, wherein the at least one longitudinal groove is provided in the outer surface of said sheath.

4. The flat energy cable according to claim 2, wherein the connecting system comprises a band attached onto the outer surface of said sheath and the longitudinal groove is provided in the outer surface of said band.

5. The flat energy cable according to claim 2, wherein at least some of the clips are guided by the at least one groove to be able to move in a longitudinal direction of the sheath.

6. The flat energy cable according to claim 1, wherein a spacer is arranged between two adjacent clips in a row.

7. The flat energy cable according to claim 6, wherein the spacer connects the two adjacent clips, respectively.

8. The flat energy cable according to claim 6, wherein the spacer is elastically bendable.

9. The flat energy cable according to claim 8, wherein the spacer is a helical spring.

10. The flat energy cable according to claim 6, wherein the spacer comprises a first portion connected with a first clip, a second portion connected with a second clip and a hinge connecting the first and the second portions.

11. The flat energy cable according to claim 6, wherein the spacer comprises a first spacer element connected with a first clip and a second spacer element connected with a second clip, wherein the first spacer element is positioned at a distance from the second spacer element.

12. The flat energy cable according to claim 1, wherein the connecting system comprises at least two longitudinal grooves arranged on opposite sides of said cable.

13. The flat energy cable according to claim 12, wherein the connecting system comprises at least two pairs of longitudinal grooves arranged on opposite sides of the cable.

14. The flat energy cable according to claim 12, wherein the grooves are arranged symmetrically with respect to a neutral bending plane.

15. The flat energy cable according to claim 14, wherein the grooves are arranged symmetrically with respect to a plane perpendicular to the neutral bending plane.

16. The flat energy cable according to claim 1, wherein the at least one push-pull strength member is arranged with an axis thereof laying in a neutral bending plane of the cable.

17. The flat energy cable according to claim 1, wherein the at least one push-pull strength member comprises a central tensile bearing element surrounded by a containment layer.

18. The flat energy cable according to claim 17, wherein the central tensile bearing element comprises fibrous material selected from aromatic polyamide, carbon, high modulus fiber or a combination thereof.

19. The flat energy cable according to claim 17, wherein the containment layer comprises an elastomeric layer.

20. The flat energy cable according to claim 19, wherein the containment layer comprises two layers.

21. The flat energy cable according to claim 20, wherein the containment layer comprises a shell made of a material layer having a flexural modulus higher than the flexural modulus of the material of the elastomeric layer.

22. The flat energy cable according to claim 1, wherein the sheath comprises an inner sheath portion in which the at least one core is embedded and an outer sheath portion surrounding the inner sheath portion, wherein a pattern of reinforcement threads running in a longitudinal direction is arranged between the inner and the outer sheath portions.

* * * * *